(12) United States Patent
Kanada et al.

(10) Patent No.: US 11,444,508 B2
(45) Date of Patent: Sep. 13, 2022

(54) ELECTRIC MOTOR, ROTARY DRIVE SYSTEM, AND HYDRAULIC EXCAVATOR

(71) Applicant: Komatsu Ltd., Tokyo (JP)

(72) Inventors: Takuya Kanada, Tokyo (JP); Takaaki Kimura, Tokyo (JP); Ryuichi Kuramae, Tokyo (JP); Teiichirou Chiba, Tokyo (JP); Atsuyoshi Koshiba, Tokyo (JP); Akira Minamiura, Tokyo (JP)

(73) Assignee: Komatsu Ltd., Tokyo (JP)

( * ) Notice: Subject to any disclaimer, the term of this patent is extended or adjusted under 35 U.S.C. 154(b) by 225 days.

(21) Appl. No.: 16/757,822

(22) PCT Filed: Oct. 24, 2018

(86) PCT No.: PCT/JP2018/039461
§ 371 (c)(1),
(2) Date: Apr. 21, 2020

(87) PCT Pub. No.: WO2019/150672
PCT Pub. Date: Aug. 8, 2019

(65) Prior Publication Data
US 2021/0194313 A1 Jun. 24, 2021

(30) Foreign Application Priority Data

Jan. 31, 2018 (JP) .............................. JP2018-015914

(51) Int. Cl.
*H02K 1/32* (2006.01)
*H02K 5/20* (2006.01)
(Continued)

(52) U.S. Cl.
CPC ............... *H02K 5/203* (2021.01); *H02K 1/32* (2013.01); *H02K 7/14* (2013.01); *H02K 9/19* (2013.01); *H02K 7/116* (2013.01)

(58) Field of Classification Search
CPC ............ H02K 5/203; H02K 5/20; H02K 5/02; H02K 5/04; H02K 5/08; H02K 1/32;
(Continued)

(56) References Cited

U.S. PATENT DOCUMENTS

2006/0066159 A1* 3/2006 Enomoto ............... H02K 5/203
310/54
2013/0334912 A1 12/2013 Tokunaga et al.
(Continued)

FOREIGN PATENT DOCUMENTS

CN 104143892 A 11/2014
JP 2006-296010 A 10/2006
(Continued)

*Primary Examiner* — Bryan R Perez
(74) *Attorney, Agent, or Firm* — Locke Lord LLP

(57) ABSTRACT

An electric motor includes a rotor, a stator, and an electric motor casing. The electric motor casing forms a first accommodating space accommodating a rotary shaft and a rotor core and a stator, and has an inner peripheral surface including an abutting inner peripheral surface in contact with a top portion on the radially outer side of a core convex portion. An outer peripheral-side flow path through which a cooling medium is capable of flowing is formed between the core convex portions adjacent to each other in the peripheral direction. The outer peripheral-side flow path is defined by an outer peripheral surface of the core main body and the inner peripheral surface of the electric motor casing.

10 Claims, 9 Drawing Sheets

(51) Int. Cl.
*H02K 7/14* (2006.01)
*H02K 9/19* (2006.01)
*H02K 7/116* (2006.01)

(58) Field of Classification Search
CPC . H02K 7/14; H02K 7/116; H02K 9/19; H02K 9/083; H02K 9/006; H02K 9/08
See application file for complete search history.

(56) References Cited

U.S. PATENT DOCUMENTS

| | | |
|---|---|---|
| 2014/0333163 A1 | 11/2014 | Horii |
| 2014/0364263 A1 | 12/2014 | Tokunaga et al. |
| 2015/0015099 A1 | 1/2015 | Matsuki et al. |
| 2015/0303763 A1 | 10/2015 | Takimoto et al. |
| 2018/0109222 A1* | 4/2018 | Suzuki ................. H02K 7/116 |

FOREIGN PATENT DOCUMENTS

| | | |
|---|---|---|
| JP | 2007-020337 A | 1/2007 |
| JP | 2007-331428 A | 12/2007 |
| JP | 2011-188686 A | 9/2011 |
| JP | 2012-182952 A | 9/2012 |
| JP | 2013-192361 A | 9/2013 |
| JP | 2014-068453 A | 4/2014 |
| JP | 2015-208154 A | 11/2015 |
| JP | 2017-212860 A | 11/2017 |

* cited by examiner ELECTRIC MOTOR, ROTARY DRIVE SYSTEM, AND HYDRAULIC EXCAVATOR

TECHNICAL FIELD

The present invention relates to an electric motor, a rotary drive system and a hydraulic excavator.

This application claims priority based on Japanese Patent Application No. 2018-015914, filed on Jan. 31, 2018, in Japan, the contents of which are incorporated herein by reference.

BACKGROUND TECHNOLOGY

Patent Document 1 describes an electric motor used for driving a construction machine or the like. The electric motor includes a rotor having a rotary shaft and a rotor core, a stator surrounding the rotor core from the outer peripheral side thereof, and an electric motor casing accommodating the rotor and the stator. The outer peripheral surface of the stator is fitted onto an inner peripheral surface of the electric motor casing over the entire circumference.

A flow path through which lubricating oil flows is formed in the rotor. The lubricating oil cools the rotor core in a process of flowing through the rotor. Thereafter, the lubricating oil is discharged to a space inside the electric motor casing to cool the stator. The electric motor casing is a so-called water jacket, and a flow path through which the cooling water flows is formed. The stator core is cooled from the outer peripheral side thereof by the cooling water flowing through the flow path.

PRIOR ART DOCUMENT

Patent Document

[Patent Document 1] Japanese Unexamined Patent Application Publication No. 2007-20337.

SUMMARY OF THE INVENTION

Problems to be Solved by the Invention

Since heat generation is large in a portion on the outer peripheral side of the stator core, it is required to cool said portion more effectively.

On the other hand, in the case of a water jacket system in which cooling water is passed through an electric motor casing, it is necessary to form a flow path in the electric motor casing. Therefore, the production cost is increased. Further, it is necessary to manage both the cooling water and the lubricating oil supplied to the space inside the electric motor casing, thereby the maintenance cost increases.

The present invention is provided in consideration of such problems, and it is an object to provide an electric motor capable of effectively cooling a stator core while reducing cost, and a rotary drive system and a hydraulic excavator provided with the same.

Means for Solving the Problem

An aspect of the present invention provides an electric motor, including: a rotor including a rotary shaft provided so as to be rotatable about an axis thereof and a rotor core fixed to an outer peripheral surface of the rotary shaft; a stator including: a core main body having a cylindrical shape surrounding the rotor core from an outer peripheral side of the rotor core; a plurality of core convex portions provided at intervals in a peripheral direction, and each of which projects from an outer peripheral surface of the core main body and which extends in an axial direction of the rotary shaft; and a plurality of coils attached to the core main body; and a casing in which a first accommodating space accommodating the rotor and the stator is formed and which has an inner peripheral surface including an abutting inner peripheral surface on which a top portion of the core convex portion outside in a radial direction abuts, wherein an outer peripheral-side flow path on which lubricating oil is capable of flowing is formed between the core convex portions adjacent to each other in the peripheral direction by the outer peripheral surface of the core main body and the inner peripheral surface of the casing.

According to the electric motor having the above-described structure, it is possible to form the outer peripheral-side flow path on which lubricating oil is directly brought into contact with the outer peripheral surface of the core main body of the stator core. Further, since it is not necessary to carry out a processing of separately forming a flow path in the stator or the casing, the processing is not complicated.

An aspect of the present invention provides a rotary drive system, including: the electric motor in which the rotary shaft is provided so as to be rotatable about the axis extending in the vertical direction, a speed reducer including an output shaft provided to be rotatable about the axis on the lower side of the rotary shaft projecting from the casing to the lower side, a transmission portion configured to reduce speed of a rotation of the rotary shaft and transmit the reduced rotation to the output shaft, and a speed reducer casing forming a second accommodating space accommodating the output shaft and the transmission portion, a lubricating oil-circulating unit configured to supply lubricating oil into the first accommodating space, recover the lubricating oil introduced into the second accommodating space from the first accommodating space, and supply again the lubricating oil to the first accommodating space.

BRIEF DESCRIPTION OF DRAWINGS

In FIG. 7, a rotor, coils and teeth are omitted.

MODE FOR CARRYING OUT THE INVENTION

An embodiment of the present invention will be described in detail below with reference to FIG. 1 to FIG. 9.

<Work Machine>

Figure 1:
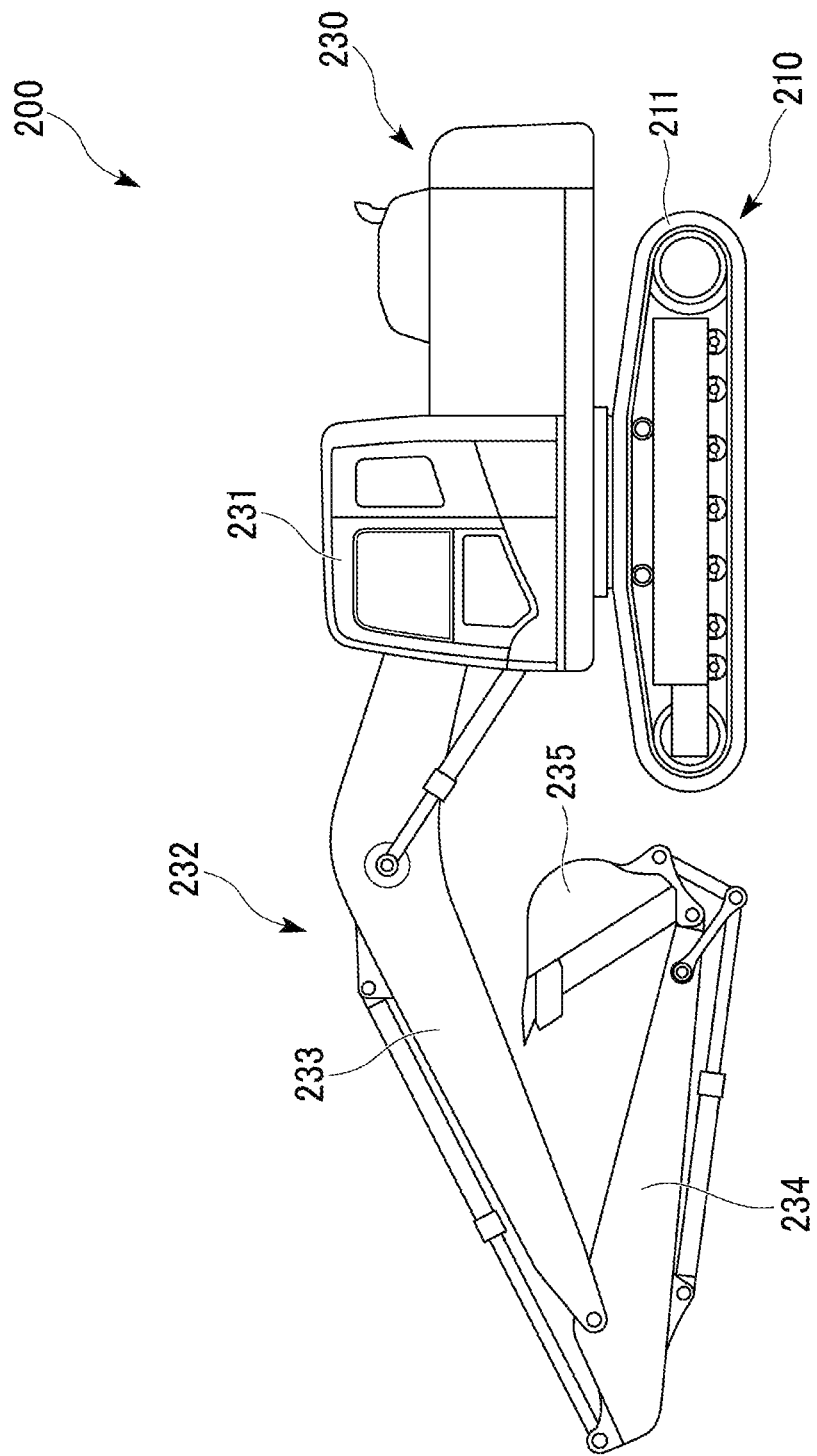
FIG. 1 is a side view of a hydraulic excavator provided with a rotary drive system related to an embodiment of the present invention.
Figure 2:
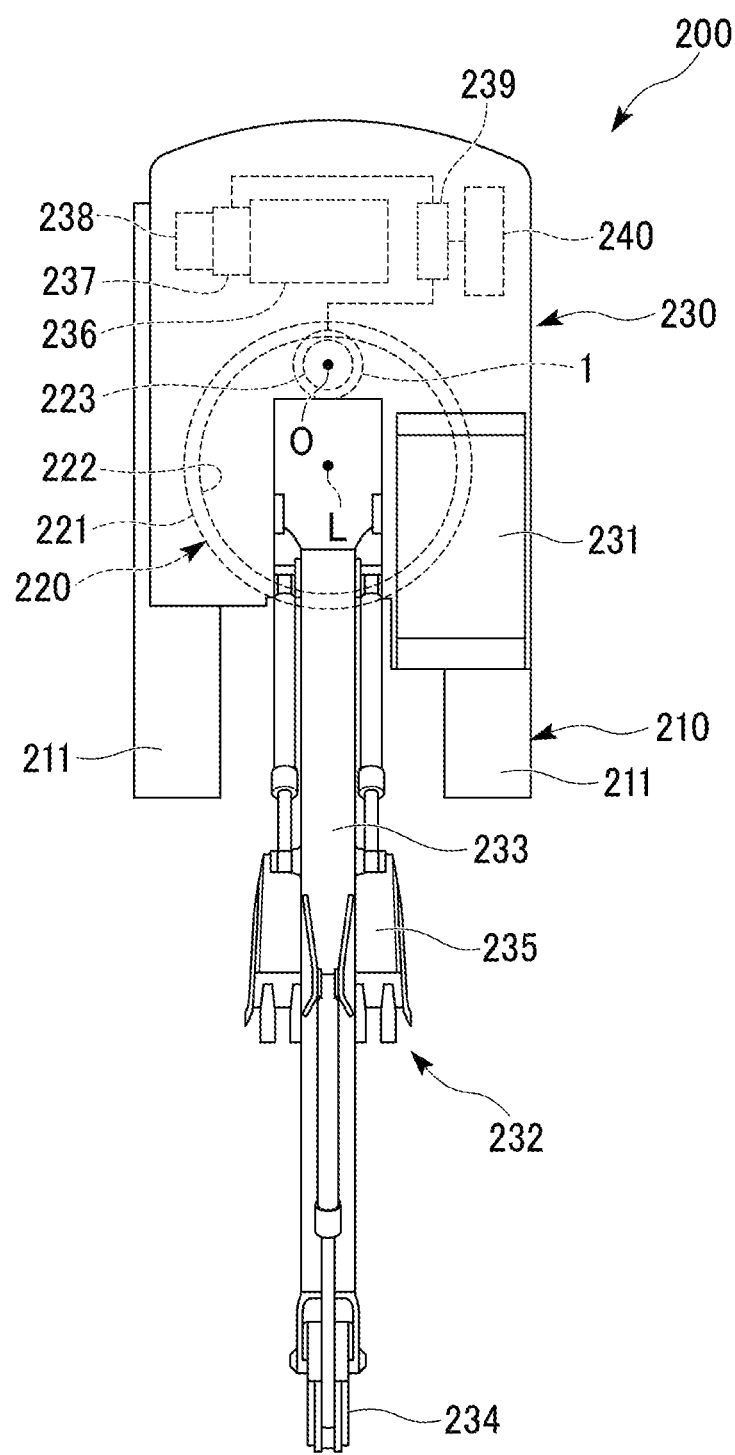
FIG. 2 is a plan view of the hydraulic excavator provided with the rotary drive system according to the embodiment of the present invention.

As shown in FIGS. 1 and 2, a hydraulic excavator 200 as a work machine includes an undercarriage 210, a swing circle 220, and an upper swing body 230. In the following, the direction in which gravity is applied in a state in which the work machine is placed on the horizontal surface is referred to as a "vertical direction". A front of an operator's seat in the cab 231 will be referred to simply as "forward", and a rear thereof will be simply referred to as "rearward".

The undercarriage 210 includes a pair of right and left crawler belts 211, 211, and these crawler belts 211, 211 are driven by a travel-use hydraulic motor (not shown) thereby causing the hydraulic excavator 200 to travel.

The swing circle 220 is a member for connecting the undercarriage 210 and the upper swing body 230, and includes an outer race 221, an inner race 222, and a swing pinion 223. The outer race 221 is supported by the undercarriage 210, and has an annular shape centered on a swing axis L extending in the vertical direction. The inner race 222 is an annular member that is coaxial with the outer race 221, and is disposed inside the outer race 221.

The inner race 222 is supported so as to be relatively rotatable about the swing axis L with respect to the outer race 221. The swing pinion 223 meshes with inner teeth of the inner race 222, and the inner race 222 rotates relative to the outer race 221 by a rotation of the swing pinion 223.

The upper swing body 230 is disposed so as to be capable of swinging about the swing axis L with respect to the undercarriage 210 by being supported by the inner race 222. The upper swing body 230 includes a cab 231, a work equipment 232, an engine 236 provided rearward the cab and the work equipment, a generator motor 237, a hydraulic pump 238, an inverter 239, a capacitor 240, and a rotary drive system 1.

The cab 231 is disposed forward and on the left side of the upper swing body 230, and is provided with an operator's seat. The work equipment 232 is provided so as to extend forward the upper swing body 230, and has a boom 233, an arm 234, and a bucket 235. The work equipment 232 performs various operations such as excavation by driving the boom 233, the arm 234, and the bucket 235 by respective hydraulic cylinders (not shown).

Shafts of the engine 236 and the generator motor 237 are spline-coupled to each other. The generator motor 237 is driven by the engine 236 to generate electric power. Rotation shafts of the generator motor 237 and the hydraulic pump 238 are spline-coupled to each other. The hydraulic pump 238 is driven by the engine 236. A hydraulic pressure generated by driving the hydraulic pump 238 drives the aforementioned travel-use hydraulic motor and each of the hydraulic cylinders.

The generator motor 237, the capacitor 240 and the rotary drive system 1 are electrically connected to each other via the inverter 239. In addition, another storage device such as a lithium ion battery, or the like, may be used instead of the capacitor 240. An output of the rotary drive system 1 is transmitted to the swing pinion 223 which meshes with the inner teeth of the inner race 222.

The rotary drive system 1 is disposed so that an axis O serving as the center of rotation extends in the vertical direction. The term "extending in the vertical direction" means that a direction of the axis O extends in a direction including the vertical direction, that is, it also includes a case in which the axis O is inclined with respect to a direction corresponding to the vertical direction.

The hydraulic excavator 200 drives the rotary drive system 1 by electric power generated by the generator motor 237 or by electric power from the capacitor 240. A driving force of the rotary drive system 1 is transmitted to the inner race 222 via the swing pinion 223. As a result, the inner race 222 rotates relative to the outer race 221, thereby swinging the upper swing body 230.

When a swing of the upper swing body 230 is decelerated, the rotary drive system 1 functions as a generator to generate electric power as regenerative energy. This electric power is stored in the capacitor 240 via the inverter 239. The electric power stored in the capacitor 240 is supplied to the generator motor 237 at the time of accelerating the engine 236. By the generator motor 237 being driven by the electric power of the capacitor, the generator motor 237 assists an output of the engine 236.

<Rotary Drive System>

Figure 3:
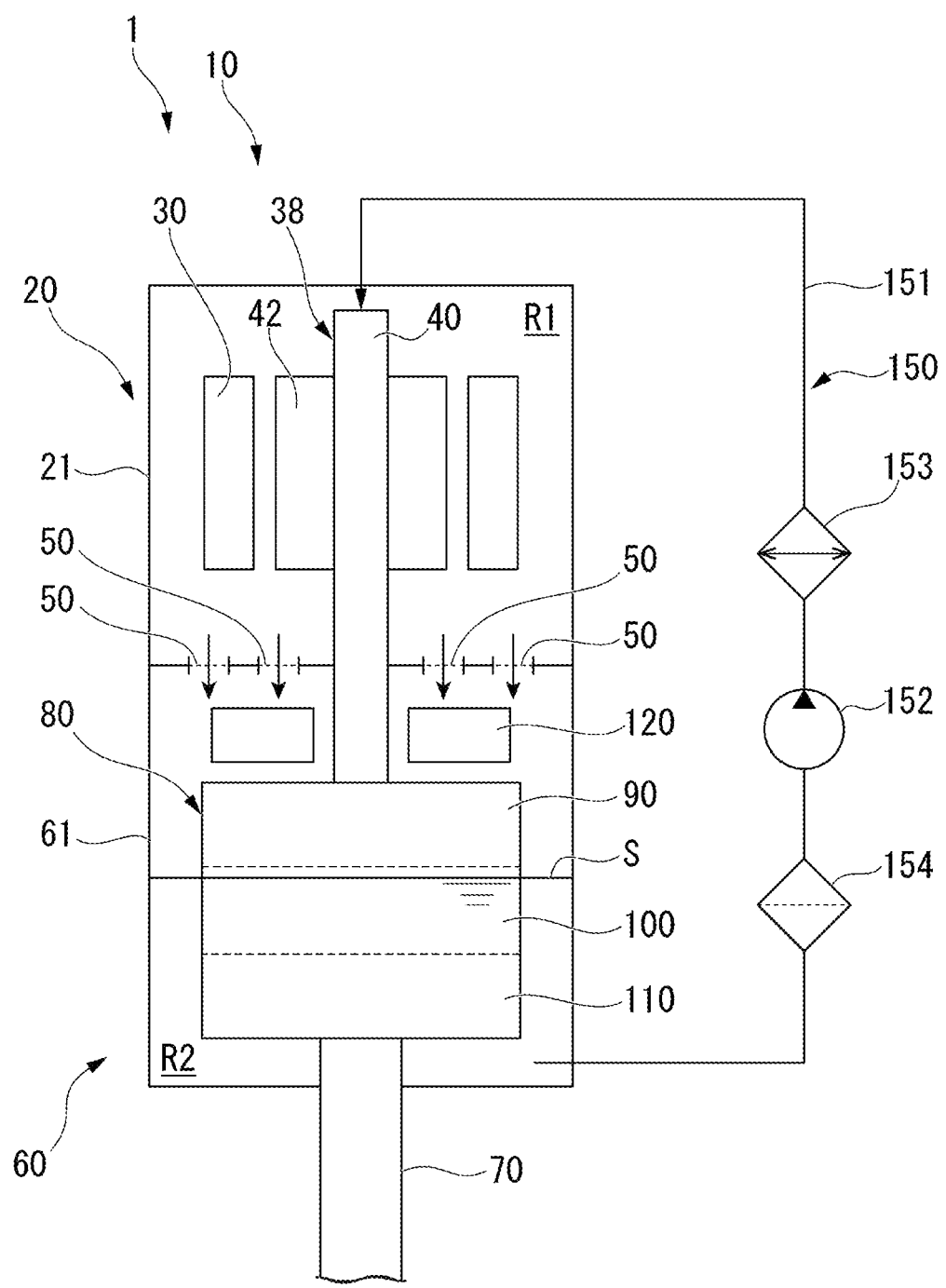
FIG. 3 is a schematic diagram showing an outline of the rotary drive system relating to the embodiment of the present invention.

As shown in FIG. 3, the rotary drive system 1 includes a rotary drive device 10 and a lubricating oil-circulating unit 150. The axis O, which serves as the center of rotation of the rotary drive system 1, is inclined with respect to the vertical direction in accordance with a posture of the hydraulic excavator 200. Therefore, in the following description, an upper side in the direction of the axis O, which is the upper side when the hydraulic excavator 200 is placed on the horizontal surface, is simply referred to as "upper side in the axial O direction". In addition, a lower side in the direction of the axis O, which is the lower side when the hydraulic excavator 200 is placed on the horizontal surface, is referred to as the "lower side in the axial O direction".

<Rotary Drive Device>

Figure 4:
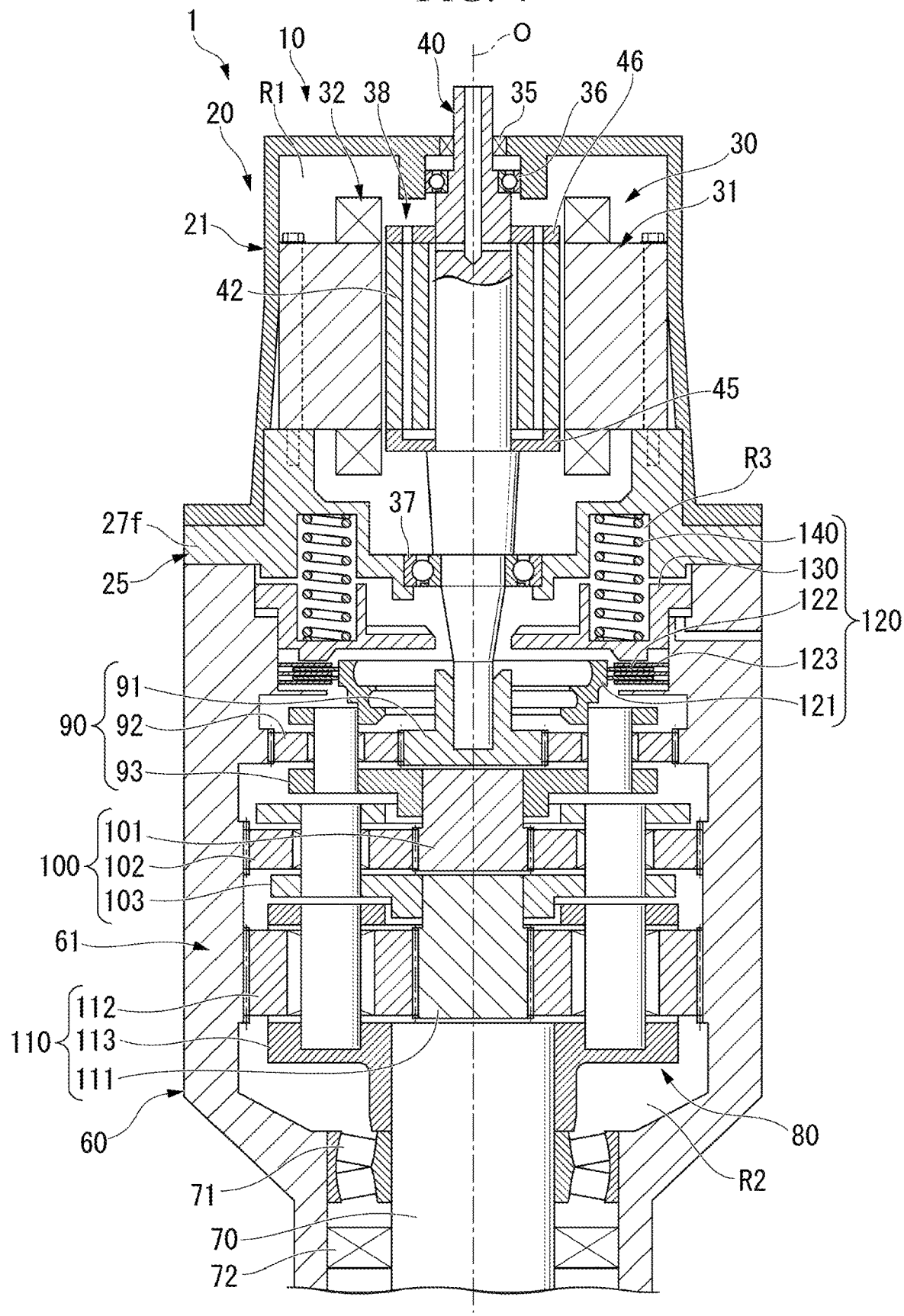
FIG. 4 is a longitudinal sectional view of the rotary drive device in the rotary drive system according to the embodiment of the present invention.

As shown in FIGS. 3 and 4, the rotary drive device 10 includes an electric motor 20 and a speed reducer 60 provided integrally with the electric motor 20. The speed reducer 60 is disposed below the electric motor 20 in the direction of the axis O.

<Electric Motor>

Figure 5:
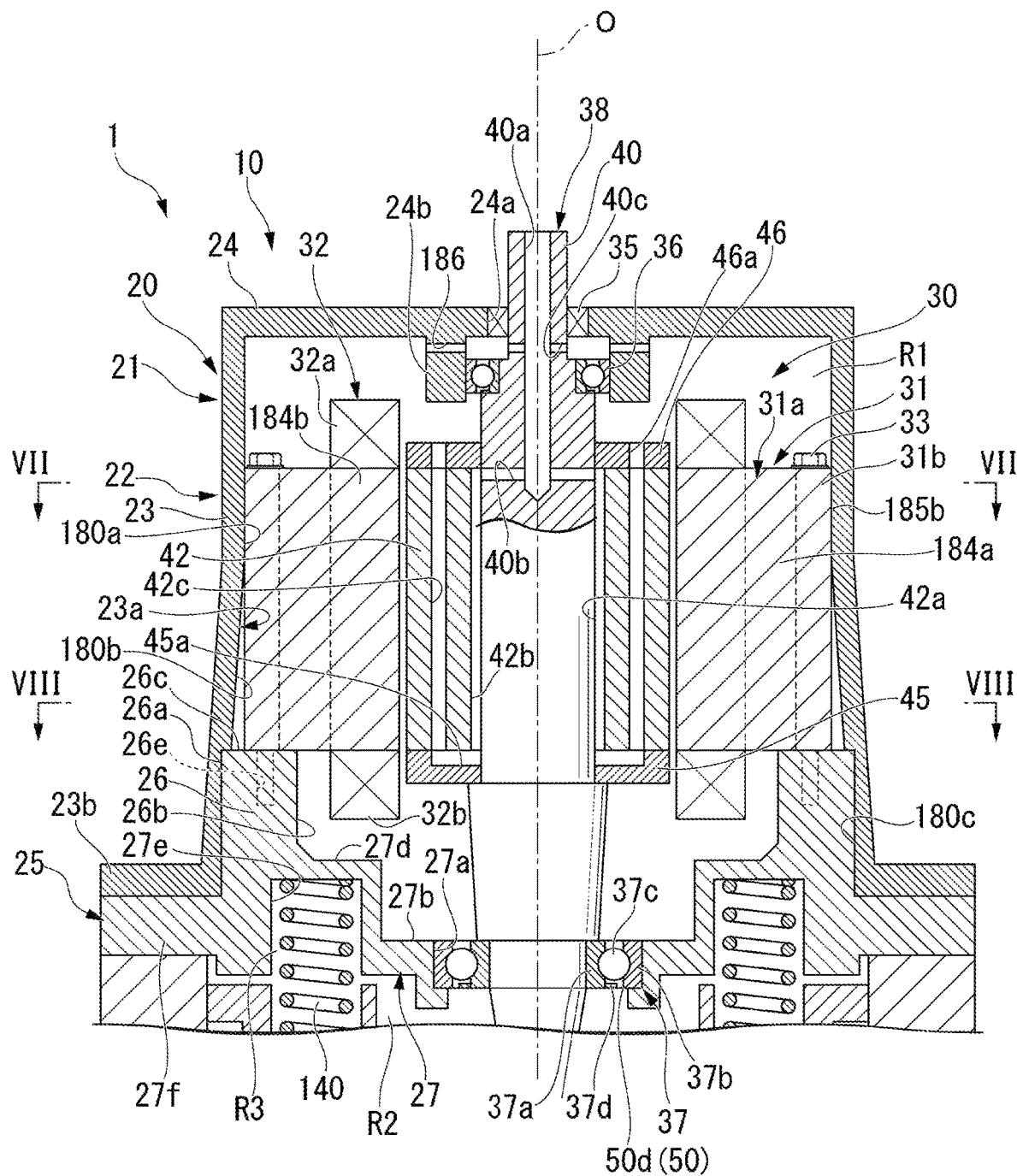
FIG. 5 is an enlarged view of the electric motor in FIG. 4.
Figure 6:
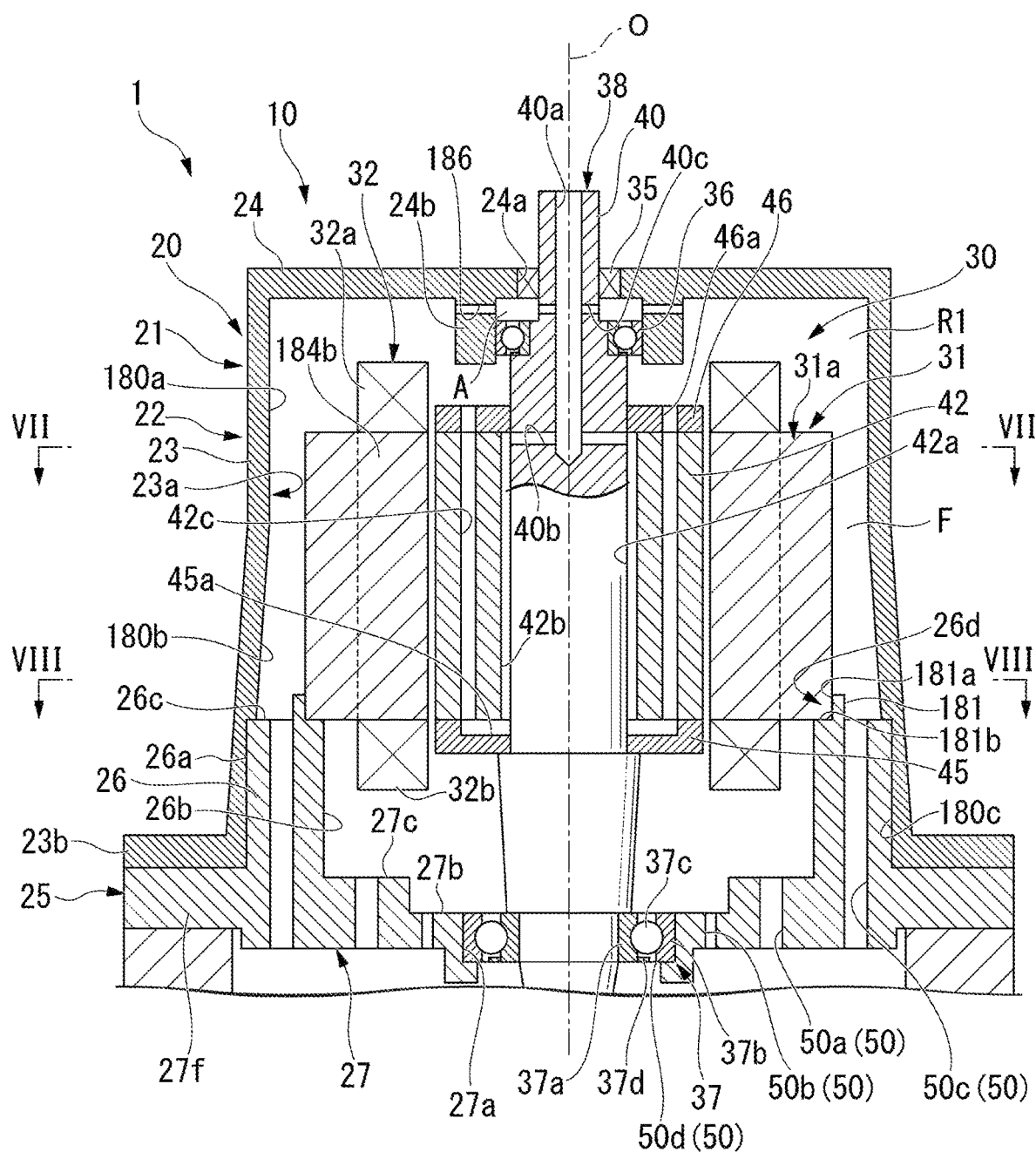
FIG. 6 is a vertical sectional view of the electric motor of the rotary drive system according to the embodiment of the present invention at a position different from that shown in FIG. 4.

As shown in FIGS. 5 and 6, the electric motor 20 includes an electric motor casing 21, a stator 30, and a rotor 38.

<Electric Motor Casing>

As shown in FIGS. 5 and 6, the electric motor casing 21 is a member that forms an outer shape of the electric motor 20. The electric motor casing 21 has a first casing 22 and a second casing 25.

<First Casing>

The first casing 22 has a bottomed cylindrical shape having a first cylindrical portion 23 that extends in the axial O direction and a first bottom portion 24 that closes the upper side in the axial O direction (the other side in the axial O direction) of the first cylindrical portion 23. A sectional shape orthogonal to the axis O of an inner peripheral surface 23a of the first cylindrical portion 23 has a circular shape. The inner peripheral surface 23a of the first cylindrical portion 23 has an abutting inner peripheral surface 180a, a tapered inner peripheral surface 180b, and a cylindrical inner peripheral surface 180c.

The abutting inner peripheral surface 180a forms an upper portion on the inner peripheral surface 23a of the first cylindrical portion 23. The abutting inner peripheral surface 180a has a circular shape in a sectional view orthogonal to the axis O, and has a cylindrical inner surface shape extending in the axial O direction at a uniform inner diameter. An upper end (an end portion on the other side in the axial O direction) of the abutting inner peripheral surface 180a is connected to the first bottom portion 24.

The tapered inner peripheral surface 180b has a circular shape in a sectional view orthogonal to the axis O, and has a tapered shape that expands in diameter toward the lower side in the axial O direction (one side in the axial O direction).

The cylindrical inner surface 180c forms a lower portion of the inner peripheral surface 23a of the first cylindrical portion 23. The cylindrical inner peripheral surface 180c has a circular shape in a sectional view orthogonal to the axis O, and has a cylindrical inner surface shape extending in the axial O direction with a uniform inner diameter. The cylindrical inner peripheral surface 180c is connected to a lower end of the tapered inner peripheral surface 180b through a step portion.

The first cylindrical portion 23 of the present embodiment is formed in a solid structure in which a hole portion such as a flow path is not formed therein.

A first through-hole 24a passing through the first bottom portion 24 with the axis O as the center is formed in the first bottom portion 24. An annular convex portion 24b that is projected from a surface facing downward of the first bottom portion 24 so as to form an annular shape centered on the axis O is formed around the first through-hole 24a.

A first flange 23b is provided on the lower end of the first cylindrical portion 23 so as to protrude from the outer peripheral surface of the first cylindrical portion 23 toward the outer peripheral side thereof.

<Second Casing>

The second casing 25 has a bottomed cylindrical shape having a second cylindrical portion 26 that has a cylindrical shape extending in the axial O direction and a second bottom portion 27 that closes the lower side in the axial O direction of the second cylindrical portion 26. The inner peripheral surface 26b of the second cylindrical portion 26 has a circular shape in a sectional view orthogonal to the axis O and has a uniform inner diameter in the axial O direction.

The outer peripheral surface 26a of the second cylindrical portion 26 has a cylindrical inner surface shape extending in the axial O direction with a uniform inner diameter in a sectional shape orthogonal to the axis O. The outer peripheral surface 26a of the second cylindrical portion 26 is capable of being fitted onto the cylindrical inner peripheral surface 180c of the first cylindrical portion 23 in the first casing 22 from the inside of the cylindrical inner peripheral surface 180c.

An end surface of the second cylindrical portion 26 facing upward in the axial O direction is an upper end surface 26c formed in a flat shape orthogonal to the axis O direction. A radially outer end portion of the upper end surface 26c is connected to the upper end of the outer peripheral surface 26a of the second cylindrical portion 26. A radially inner end portion of the upper end surface 26c is connected to the upper end of the inner peripheral surface 26b of the second cylindrical portion 26.

Figure 8:
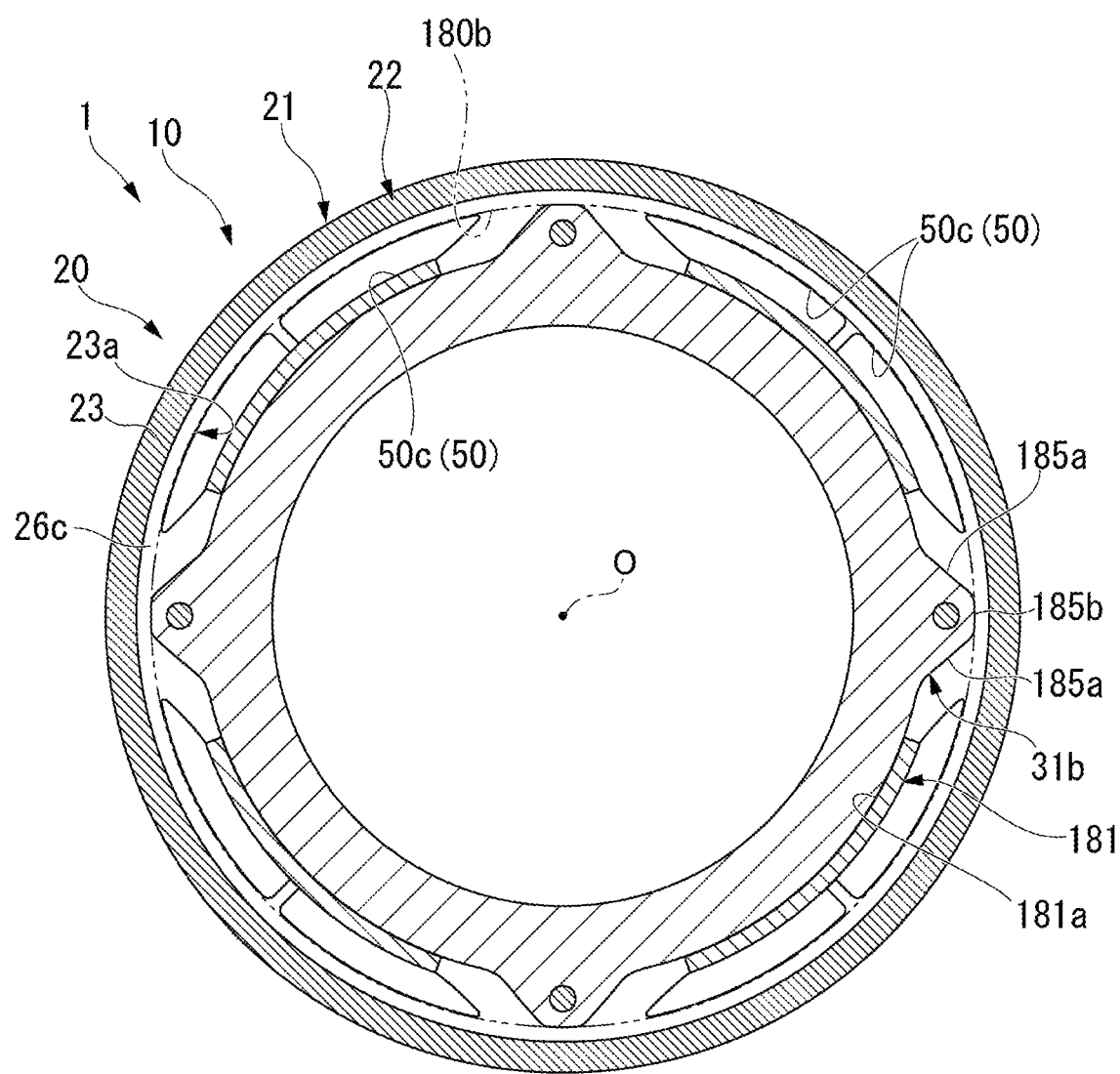
FIG. 8 is a sectional view taken along the line VIII-VIII in FIG. 5 and FIG. 6.

As shown in FIG. 6 and FIG. 8, the second cylindrical portion 26 has a convex portion 181 projecting from the upper end surface 26c. The convex portion 181 projects upward in the axial O direction from a radially outer portion as compared with the radially inner end portion in the upper end surface 26c. The convex portion 181 is provided so as to extend in a peripheral direction with the peripheral direction as a longitudinal direction. A plurality of convex portions 181 are formed at intervals in the peripheral direction. In the present embodiment, four convex portions 181 are formed at equal intervals in the peripheral direction. A surface of the convex portion 181 facing radially inward is formed as a fitting inner peripheral surface 181a having a cylindrical inner surface shape which has a circular shape orthogonal to the axis O. The fitting inner peripheral surface 181a has a uniform inner diameter in the axial O direction. The convex portion 181 and the fitting inner peripheral surface 181a have an arc shape in a sectional shape orthogonal to the axis O. The lower end of the fitting inner peripheral surface 181a is connected to a mounting end surface 181b which is a radially inner portion of the fitting inner peripheral surface 181a in the upper end surface 26c. The fitting inner peripheral surface 181a and the mounting end surface 181b intersect at right angles to each other. The fitting portion 26d to which the stator core 31 to be described later is fitted is formed by the fitting inner peripheral surface 181a and the mounting end surface 181b.

A second through-hole 27a passing through the second bottom portion 27 with the axis O as the center is formed in the second bottom portion 27.

A portion around the second through-hole 27a in the surface facing upward in the axial O direction of the second bottom portion 27 is a first bottom surface 27b forming an annular shape and forming a flat shape orthogonal to the axis O. Around the first bottom surface 27b of the second bottom portion 27, a second bottom surface 27c (see FIG. 6) and a third bottom surface 27d (see FIG. 5) are formed.

As shown in FIG. 6, the second bottom surface 27c is a portion adjacent to the outer peripheral side of the first bottom surface 27b, and is formed to be one step higher than the first bottom surface 27b. The second bottom surface 27c forms a flat shape orthogonal to the axis O. A plurality of second bottom surfaces 27c are formed at intervals in the peripheral direction of the axis O.

As shown in FIG. 5, the third bottom surface 27d is provided adjacent to the outer peripheral side of the first bottom surface 27b similarly to the second bottom surface 27c and adjacent to the second bottom surface 27c in the peripheral direction. The third bottom surface 27d is formed to be one step higher than the second bottom surface 27c. A plurality of third bottom surfaces 27d are formed at intervals in the peripheral direction of the axis O. In the present embodiment, the plurality of second bottom surfaces 27c and the plurality of third bottom surfaces 27d are alternately provided in the peripheral direction. An inner peripheral surface 26b of the second cylindrical portion 26 is connected to an outer peripheral side of the second bottom surface 27c and the third bottom surface 27d. Each bottom surface does not need to be adjacent to each other in a case where the radial positional relationship is defined.

As shown in FIG. 5, an electric motor-side accommodating recess 27e that recesses from the lower surface of the second bottom portion 27 toward the upper side in the axial direction is formed in a portion of a peripheral position corresponding to the third bottom surface 27d on a surface facing the lower side in the axial O direction of the second bottom portion 27. A plurality of the electric motor-side accommodating recesses 27e are formed at intervals in the peripheral direction so as to correspond to the third bottom surface 27d.

The second cylindrical portion 26 is fitted to the first cylindrical portion 23 so as to be inserted from the lower side in the axial O direction. The outer peripheral surface 26a of the second cylindrical portion 26 is fitted onto the cylindrical inner peripheral surface 180c of the first cylindrical portion 23 from the inside of the first cylindrical portion 23. The upper end of the outer peripheral surface 26a of the second cylindrical portion 26 does not reach the tapered inner peripheral surface 180b of the first cylindrical portion 23, but is located within the range of the cylindrical inner peripheral surface 180c in the axial O direction.

The first flange 23b and the lower portion flange 27f are in contact with each other over the peripheral direction.

Thus, the second cylindrical portion 26 and the first cylindrical portion 23 are integrally fixed to each other. An inner space of the electric motor casing 21 formed by the second cylindrical portion 26 and the first cylindrical portion 23 is a first accommodating space R1.

<Stator>

As shown in FIG. 5 to FIG. 8, the stator 30 includes a stator core 31 and a coil 32.

The stator core 31 is constituted by stacking a plurality of electromagnetic steel plates in the axial O direction and includes a core main body 31a and a core convex portion 31b.

The core main body 31a is constituted by a yoke 184a having a cylindrical shape centered on the axis O and teeth 184b formed at intervals in the peripheral direction of the yoke 184a so as to project from the inner peripheral surface of the yoke 184a. An outer peripheral surface 183 of the core main body 31a, which is an outer peripheral surface of the yoke 184a, has a circular shape in a sectional surface orthogonal to the axis O and has a cylindrical surface shape having a uniform outer diameter in the axial O direction. The outer diameter of the outer peripheral surface 183 of the core main body 31a corresponds to the inner diameter of the fitting inner peripheral surface 181a of the convex portion 181 in the second casing 25 of the electric motor casing 21. That is, the outer peripheral surface 183 of the core main body 31a has an outer diameter that is capable of being fitted onto the fitting inner peripheral surface 181a.

Figure 7:
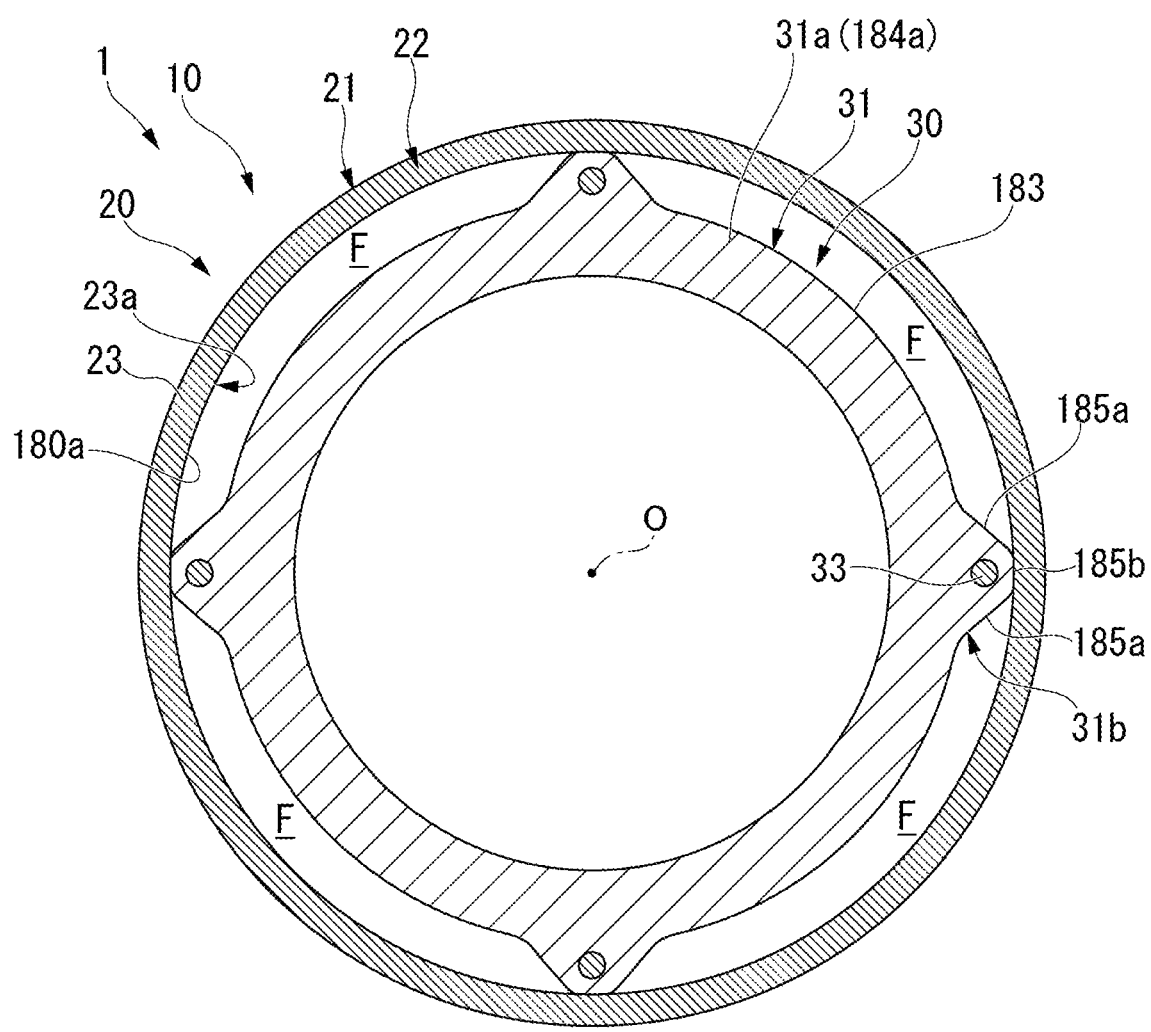
FIG. 7 is a sectional view taken along the line VII-VII in FIGS. 5 and 6.

The core convex portion 31b is formed so as to project from the outer peripheral surface 183 of the core main body 31a. A plurality of core convex portions 31b are provided at intervals in the peripheral direction. In the present embodiment, as shown in FIG. 7, four core convex portions 31b are formed at equal intervals in the peripheral direction. Each core convex portion 31b extends over the entire axial O direction of the core main body 31a. That is, each core convex portion 31b is formed over an upper end and a lower end of the core main body 31a, and the upper end and the lower end of each core convex portion 31b are flush with the upper end and the lower end of the core main body 31a. The core convex portion 31b has a uniform sectional shape orthogonal to the axis O over the axial O direction.

As shown in FIG. 7, the core convex portion 31b has a pair of inclination surface portions 185a and a top portion 185b positioned between the inclination surface portions 185a in a sectional view orthogonal to the axis O.

The pair of inclination surfaces 185a are surfaces opposed to each other in the peripheral direction in the core convex portion 31b, and are inclined with respect to the radial direction so as to be closer to each other from the outer peripheral surface 183 of the core main body 31a toward the outer side in the radial direction.

Both ends of the top portion 185b in the peripheral direction are connected to the radially outer end portions of the pair of inclination surfaces 185a. That is, the top portion 185b is provided between the pair of inclination surface portions 185a. A sectional shape orthogonal to the axis O of the top portion 185b has a circular arc shape centered on the axis O. Therefore, the top portion 185b has a cylindrical outer surface shape centered on the axis O. Each top portion 185b has the same outer diameter. The outer diameter of each top portion 185b has an outer diameter corresponding to an abutting inner peripheral surface 180a in the first casing 22 of the electric motor casing 21. Thus, each top portion 185b is capable of being fitted onto the abutting inner peripheral surface 180a of the first casing 22 over the entire peripheral direction.

A plurality of coils 32 are provided so as to correspond to each of the teeth 184b, and are wound around each of the teeth 184b. As a result, the plurality of coils 32 are provided at intervals in the peripheral direction. A portion of each coil 32 projecting from the stator core 31 to the upper side in the axial O direction is an upper portion coil end 32a. A portion of each coil 32 projecting from the stator core 31 to the lower side in the axial O direction is a lower portion coil end 32b. As a winding constituting the coil 32, for example, a rectangular winding, a sectional shape of which has a quadrangular shape, and a winding having an arbitrary sectional shape are used.

<Fitting of Stator Core and Motor Casing>

In the present embodiment, the stator core 31 of the stator 30 is fitted to both the first casing 22 and the second casing 25 of the electric motor casing 21.

That is, as shown in FIG. 5, the top portion 185b of the core convex portion 31b in the stator core 31 is fitted into the abutting inner peripheral surface 180a of the first cylindrical portion 23 in the first casing 22.

That is, the top portion 185b of the core convex portion 31b is fitted into the abutting inner peripheral surface 180a from the inner side thereof.

On the other hand, as shown in FIG. 6, the corner portion between the outer peripheral surface 183 and the lower end of the core main body 31a in the stator core 31 is fitted into a fitting portion 26d of the second cylindrical portion 26 in the second casing 25. That is, the lower portion of the outer peripheral surface 183 of the core main body 31a is fitted onto the fitting inner peripheral surface 181a of the fitting portion 26d. Part of the lower end of the core main body 31a on the outer peripheral side is abutted to the mounting end surface 181b of the fitting portion 26d.

<Outer Peripheral-Side Flow Path>>

By the stator core 31 being attached to the first casing 22 and the second casing 25 of the electric motor casing 21 as described above, an outer peripheral-side flow path F in which lubricating oil is capable of flowing is formed on the outer peripheral side of the stator core 31.

As shown in FIGS. 6 and 7, the outer peripheral-side flow path F is a flow path formed between the outer peripheral surface 183 of the core main body 31a in the stator core 31 and the inner peripheral surface 23a of the electric motor casing 21. As shown in FIG. 6, the outer peripheral-side flow path F is formed from the upper end to the lower end of the stator core 31. That is, an upper portion of the outer peripheral-side flow path F is defined by the outer peripheral surface 183 of the core main body 31a and the abutting inner peripheral surface 180a of the first casing 22, and a lower portion of the outer peripheral-side flow path F is defined by the outer peripheral surface 183 of the core main body 31a and the tapered inner peripheral surface 180b of the first casing 22. A plurality of outer peripheral-side flow paths F are formed at intervals in the peripheral direction shown in FIG. 7.

As shown in FIG. 7, the plurality of outer peripheral flow paths F are formed at intervals from each other with the peripheral direction as the longitudinal direction. A core convex portion 31b is located at an end portion in the peripheral direction of the outer peripheral-side flow path F. The outer peripheral-side flow path F are sectioned into a plurality of portions in the peripheral direction by a core convex portion 31b. The inclination surface 185a of the core convex portion 31b is located at the end portion in the peripheral direction of the outer peripheral-side flow path F. In the outer peripheral-side flow path F, when viewed in a sectional view perpendicular to the axial O direction, a width size (size in the radial direction) intersecting with the longitudinal direction is made uniform in the peripheral direction in a range in which 183 of the outer peripheral surface 183 of the core main 31a and the inner peripheral surface 23a of the first casing 22 face each other.

Part in the peripheral direction of the lower end of the outer peripheral-side flow path F communicates with a region on the lower side in the axial O direction and radially inside from the stator core 31 in the first accommodating space R1.

In the present embodiment, as shown in FIGS. 5, 7 and 8, a bolt insertion hole (not shown) penetrating in the axial O direction is formed in the core convex portion 31b in the stator core 31. A bolt 33 is inserted into the bolt insertion hole from the upper side in the axial O direction. A lower end of the bolt 33 is fixed to a bolt fixing hole 26e (see FIG. 5) formed in an upper end surface 26c in the second cylindrical portion 26 of the second casing 25. A plurality of bolt fixing holes 26e (four in the present embodiment) are formed at intervals in the peripheral direction. The stator core 31 is firmly fixed and integrated to the second casing 25 by the bolt 33.

<Rotor>

As shown in FIGS. 5 and 6, the rotor 38 includes a rotary shaft 40, a rotor core 42, a lower end plate 45, and an upper end plate 46.

<Rotary Shaft>

The rotary shaft 40 is a rod-shaped member extending along the axis O. The rotary shaft 40 is disposed in the electric motor casing 21 so as to passes through the inside of the stator 30 in the axial O direction. An upper end of the rotary shaft 40 projects upward in the axial O direction of the electric motor casing 21 through the first through-hole 24a of the first bottom portion 24 in the first casing 22. The upper end of the rotary shaft 40 may be accommodated in the electric motor casing 21.

An upper seal 35 is provided between an inner peripheral surface of the first through-hole 24a of the first bottom portion 24 and an outer peripheral surface of the rotary shaft 40.

As a result, tightness in liquid in the upper end inside the electric motor casing 21 is secured.

An upper bearing 36 having an annular shape centered on the axis O is provided on an inner peripheral surface of the annular convex 24b in the first bottom portion 24. The rotary shaft 40 is vertically inserted into the upper bearing 36, and an upper portion of the rotary shaft 40 is supported by the upper bearing 36 so as to be rotatable about the axis O. A lower bearing 37 having an annular shape centered on the axis O is provided on the inner peripheral surface of the second through-hole 27a in the second bottom portion 27. The rotary shaft 40 is vertically inserted into the lower bearing 37, and the lower portion of the rotary shaft 40 is supported by the lower bearing 37 so as to be rotatable about the axis O. That is, the rotary shaft 40 is connected to the second bottom portion 27 via the lower bearing 37.

A center hole 40a extending from the upper end of the rotary shaft 40 toward the lower side in the axial O direction and a first radial hole 40b and a second radial hole 40c extending from the center hole 40a to the outer peripheral surface of the rotary shaft 40 are formed in the rotary shaft 40.

The center hole 40a does not extend over the entire axial O direction of the rotary shaft 40, and extends from the upper end of the rotary shaft 40 to the middle point toward the lower end of the rotary shaft. As a result, the rotary shaft 40 has a hollow structure in a portion where the center hole 40a is formed from the upper end to the lower end, and the remaining portion on the lower side in the axial O direction is a solid structure.

The first radial hole 40b extends in the radial direction such that the extending direction thereof coincides with the direction orthogonal to the axis O. The radially inner end portion of the first radial hole 40b communicates with a lower portion of the center hole 40a. A radially outer end portion of the first radial hole 40b opens into an outer peripheral surface of the rotary shaft 40. A plurality of first radial holes 40b are formed at intervals in the peripheral direction.

The second radial hole 40c extends in the radial direction such that the extending direction thereof coincides with the direction orthogonal to the axis O similarly to the first radial hole 40b, at the upper side in the axial O direction of the first radial hole 40b. A radially inner end portion of the second radial hole 40c communicates with the center hole 40a. A radially outer end portion of the second radial hole 40c opens into the outer peripheral surface of the rotary shaft 40. A plurality of second radial holes 40c are formed at intervals in the peripheral direction.

<Rotor Core>

The rotor core 42 has a cylindrical shape centered on the axis O, and an inner peripheral surface 42a of the rotor core is fitted on the outer peripheral surface of the rotary shaft 40 from an outside thereof. An upper end of the rotor core 42 fitted on the rotary shaft 40 from the outside thereof is a position in the axial O direction corresponding to the lower end of the center hole 40a. An outer peripheral surface of the rotor core 42 has a cylindrical surface shape centered on the axis O and faces the inner peripheral surface of the stator 30. The rotor core 42 is formed by stacking a plurality of electromagnetic steel plate in the axial O direction.

On the inner peripheral surface 42a of the rotor core 42, a plurality of inner axial-direction flow paths 42b, which have a groove shape extending over the entire axial O direction, are formed at intervals in the peripheral direction. In a portion on an outer peripheral side of the inner axial-direction flow path 42b in an inside of the rotor core 42, an outer axial-direction flow path 42c extending over the entire axial O direction is formed.

A plurality of permanent magnets (not shown) are embedded in the rotor core 42 at intervals in the peripheral direction.

<Lower End Plate>

The lower end plate 45 is a disc-like member extending in a direction orthogonal to the axis O and having a circular outer shape centered on the axis O. The lower end plate 45 is fixed so as to be stacked on the rotor core 42 from the lower side in the axial O direction of the rotor core 42.

A connection flow path 45a extending in the radial direction is formed on an upper surface of the lower end plate 45. A plurality of connection flow paths 45a are formed at intervals in the peripheral direction. The connection flow path 45a connects the inner axial-direction flow path 42b and the outer axial-direction flow path 42c of the rotor core 42 in the radial direction.

<Upper End Plate>

The upper end plate 46 is a disk-shaped member extending in a direction orthogonal to the axis O and having a circular outer shape centered on the axis O similarly to the lower end plate 45. The upper end plate 46 is fixed so as to be stacked on the rotor core 42 from the upper side in the axial O direction of the rotor core 42. The upper end plate 46 closes the inner axial-direction flow path 42b in the rotor core 42 from the upper side in the axial O direction. A plurality of discharge holes 46a passing through in the axial O direction are formed in the upper end plate 46 at intervals in the peripheral direction. Each of the discharge holes 46a communicates with the outer axial-direction flow path 42c in the rotor core 42.

As a result, a cooling flow path in which the lubricating oil flows in the order of the center hole 40a, the first radial hole 40b, the inner axial-direction flow path 42b, the connection flow path 45a, the outer axial-direction flow path 42c, and the discharge hole 46a is formed in the rotor 38. The lubricating oil introduced into the rotor 38 is discharged into the first accommodating space R1 via the rotor core flow path including the inner axial-direction flow path 42b and the outer axial-direction flow path 42c in the rotor 38.

<Cooling Flow Path of Stator>

Figure 9:
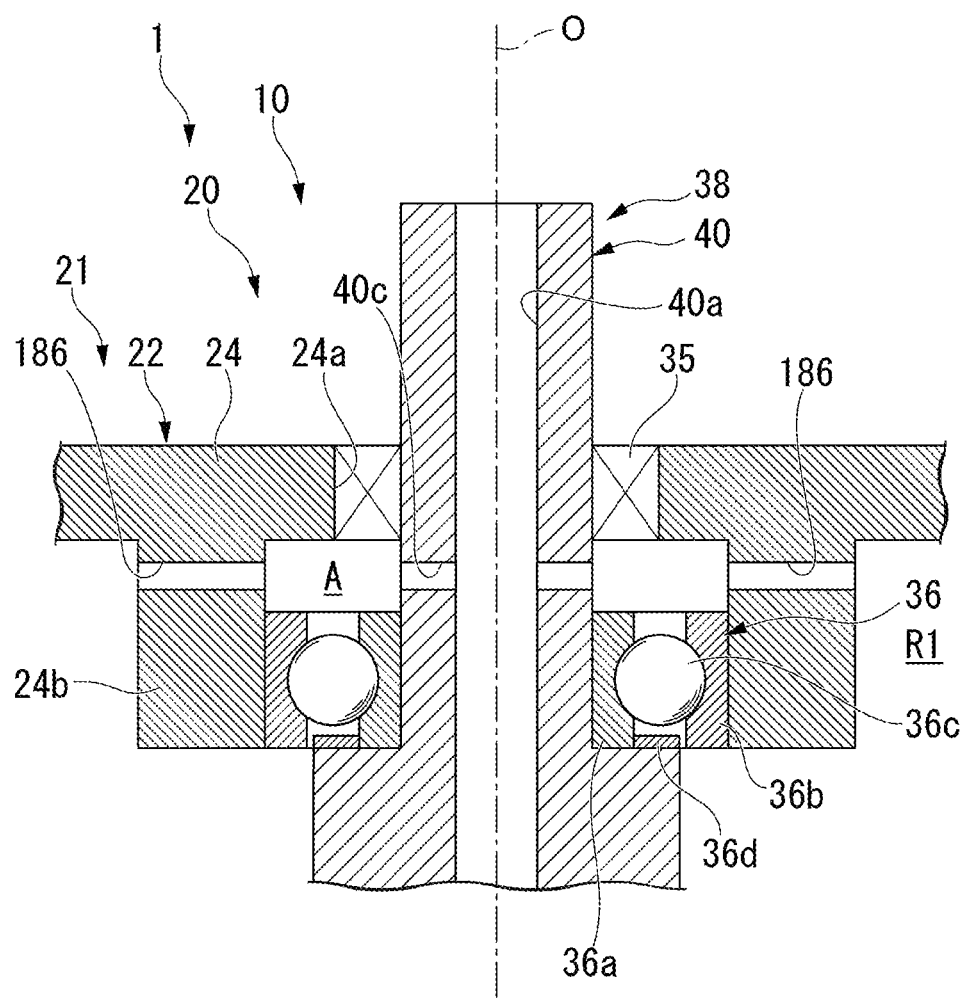
FIG. 9 is a partially enlarged view of FIG. 6.

As shown in FIG. 9, in a region between the inner peripheral surface of the annular convex portion 24b, the upper seal 35, the upper bearing 36 and the rotary shaft 40 in the first casing 22 of the electric motor casing 21, an annular space A having an annular shape surrounded by the inner peripheral surface of the annular convex portion 24b, the seal 35, the upper bearing 36 and the rotary shaft 40 of the first casing 22 of the electric motor casing 21 is formed. The second radial hole 40c in the rotary shaft 40 opens toward the annular space A.

Further, a casing flow path 186 passing through the inner peripheral surface and the outer peripheral surface of the annular convex portion 24b in the radial direction is formed in the annular convex portion 24b. A plurality of casing flow paths 186 are formed at intervals in the peripheral direction of the axis O. The radially outer end portion of the casing flow path 186 opens radially outward at the upper side in the axial O direction of the rotor core and stator.

The upper bearing 36 that defines the annular space A from the lower side in the axial O direction has an inner ring 36a, an outer ring 36b, a rolling element 36c, and a bearing shield 36d.

The inner ring 36a is an annular member, and an inner peripheral surface thereof is fixed to the outer peripheral surface of the rotary shaft.

The outer ring 36b is an annular member provided to be spaced apart from an outer peripheral surface of the inner ring 36a, and an outer peripheral surface of the outer ring 36b is fixed to the inner peripheral surface of the annular convex portion 24b. The rolling body 36c has a spherical shape, and a plurality of rolling bodies 36c is arranged so as to be interposed between the inner ring 36a and the outer ring 36b in the peripheral direction.

The bearing shield 36d is an annular member fixed to a lower end of the outer peripheral surface of the inner ring 36a. The bearing shield 36d is formed in a plate shape having a plate thickness in the axial O direction. A clearance is formed between an outer peripheral end of the bearing shield 36d and the outer ring 36b over the peripheral direction.

<Communication Hole>

As shown in FIG. 6, the electric motor casing 21 has a communication hole 50 that communicates the first accommodating space R1 in the electric motor casing 21 toward the lower side in the axial O direction.

In the present embodiment, the communication hole 50 is formed as a main oil drain hole 50a, an auxiliary oil drain hole 50b, an outer peripheral-side oil drain hole 50c, and a bearing oil drain hole 50d.

The main oil drain hole 50a is formed to open into the second bottom surface 27c in the second bottom portion 27 of the second casing 25, and vertically passes through the second bottom portion 27. A plurality of main oil drain holes 50a are formed at intervals in the peripheral direction so as to correspond to each of the second bottom surfaces 27c.

The auxiliary oil drain hole 50b is formed so as to open into the first bottom surface 27b in the second bottom portion 27 of the second casing 25, and vertically passes through the second bottom portion 27. A plurality of auxiliary oil drain holes 50b are formed at intervals in the peripheral direction. The flow path sectional area of the auxiliary oil drain hole 50b, which is a cross-sectional area orthogonal to the axis O, is smaller than the flow path sectional area of the main oil drain hole 50a.

As shown in FIG. 6 and FIG. 8, an upper end of the outer peripheral-side oil drain hole 50c is opened into the upper end face 26c of the second cylindrical portion 26 and the outer peripheral-side oil drain hole 50c vertically passes through the second cylindrical portion 26. A plurality of outer peripheral-side oil drain holes 50c are formed at intervals in the peripheral direction. The plurality of outer peripheral-side oil drain holes 50c are formed at intervals in the peripheral direction so as to avoid the bolt fixing holes 26e for fixing the stator core 31. In the present embodiment, two outer peripheral-side oil drain holes 50c spaced apart in the peripheral direction are formed at a portion facing the lower side in the axial O direction of each outer peripheral-side flow path F. The outer peripheral-side oil drain hole 50c has a slit shape extending with the peripheral direction being as a longitudinal direction.

As shown in FIG. 6, the bearing oil drain hole 50d is formed in the above-described lower bearing 37. The lower bearing 37 includes an inner ring 37a, an outer ring 37b, a rolling body 37c, and a bearing shield 37d.

The inner ring 37a is an annular member, and an inner peripheral surface thereof is fixed to the outer peripheral surface of the rotary shaft 40. The outer ring 37b is an annular member provided on an outer peripheral side of the inner ring 37a so as to be spaced apart therefrom, and the outer peripheral surface of the outer ring 37b is fixed to an inner peripheral surface of the second through-hole 27a of the second bottom portion 27. The rolling body 37c has a spherical shape, and a plurality of rolling bodies 37c is arranged in the peripheral direction so as to be interposed between the inner ring 37a and the outer ring 37b. The bearing shield 37d is an annular member fixed to a lower end of the outer peripheral surface of the inner ring 37a. The bearing shield 37d has a plate shape having a plate thickness in the axial O direction. A clearance is formed between an outer peripheral end of the bearing shield 37d and the inner peripheral surface of the outer ring 37b over the peripheral direction. The clearance is a bearing oil drain hole 50d. An opening area of the bearing oil drain hole 50d is smaller than the flow path sectional area of the auxiliary oil drain hole 50b.

The heights of upper ends of the inner ring 37a and the outer ring 37b of the lower bearing 37 are flush with the first bottom surface 27b. Therefore, the height of the opening at the upper end between the inner ring 37a and the outer ring 37b in the lower bearing 37 is the same as the height in the upper end of the auxiliary oil drain hole 50b. In addition, the height of the upper end of the auxiliary oil drain hole 50b may be lower than the upper end of the lower bearing 37. That is, the auxiliary oil drain hole 50*b* may be opened at a portion of the upper end of the lower bearing 37 on a bottom surface of the electric motor casing 21 or lower thereof.

<Speed Reducer>

Next, the speed reducer 60 will be described with reference to FIG. 4. The speed reducer 60 includes a speed reducer casing 61, an output shaft 70, a transmission portion 80, and a brake mechanism 120.

<Speed Reducer Casing>

The speed reducer casing 61 has a cylindrical shape which extends along the axis O and opens on the upper side in the axial O direction and the lower side in the axis O direction. An upper end of the speed reducer casing 61 is in contact with the lower flange 27*f* of the second casing 25 in the electric motor casing 21 over the peripheral direction. The speed reducer casing 61 is integrally fixed to the lower flange 27*f* via bolts (not shown) or the like. An opening on the upper side in the axial O direction of the speed reducer casing 61 is closed by the second casing 25 of the electric motor casing 21.

<Output Shaft>

The output shaft 70 has a rod shape extending along the axis O. A rotation of the output shaft 70 becomes an output of the rotary drive system 1. An upper portion of the output shaft 70 is disposed in the speed reducer casing 61 and a lower portion of the output shaft 70 is disposed so as to project in the lower side in the axial O direction from the speed reducer casing 61.

An output shaft bearing 71 for rotatably supporting the output shaft 70 about the axis O is provided on a lower portion of an inner peripheral surface of the speed reducer casing 61. As the output shaft bearing 71, for example, a self-aligning roller bearing is used. A lower portion in an output shaft 70 projecting from the speed reducer casing 61 to the lower side in the axial O direction is connected to the swing pinion 223.

On the inner peripheral surface of the speed reducer casing 61, further lower side in the axial O direction of the output shaft bearing 71, a lower seal 72 for sealing an annular space between the inner peripheral surface of the speed reducer casing 61 and the outer peripheral surface of the output shaft 70 is provided. A space in the speed reducer casing 61 closed from the lower side in the axial O direction by the lower seal 72 is a second accommodating space R2. The lower portion of the rotary shaft 40 projecting in the lower side in the axial O direction from the electric motor casing 21 is located at an upper portion of the second accommodating space R2. Lubricating oil is stored in a predetermined height position in the second accommodating space R2.

<Transmission Portion>

The transmission portion 80 is provided in the second accommodating space R2 in the speed reducer casing 61. The transmission portion 80 has a function of reducing a rotational speed of the rotary shaft 40 and transmitting the reduced rotational speed to the output shaft 70.

The transmission portion 80 is constituted by a plurality of stages of planetary gear mechanisms that sequentially decelerate the number of revolutions from the rotary shaft 40 to the output shaft 70. As the plurality of planetary gear mechanisms, in the present embodiment, three planetary gear mechanisms that are the first stage planetary gear mechanism 90, the second stage planetary gear mechanism 100, and the third stage planetary gear mechanism 110 are provided. At least one of the plurality of planetary gear mechanisms is immersed in the lubricating oil.

<First Stage Planetary Gear Mechanism>

The first stage planetary gear mechanism 90 is a planetary gear mechanism of the first stage. The first stage planetary gear mechanism 90 includes a first stage transmission shaft 91, a first stage planetary gear 92, and a first stage carrier 93. The first stage transmission shaft 91 is fitted to the lower end of the rotary shaft 40 from an outside thereof. A plurality of first stage planetary gears 92 are provided around the first stage transmission shaft 91. The first stage planetary gear 92 meshes with the sun gear teeth formed in the first stage transmission shaft 91 and the inner gear teeth formed in the inner peripheral surface of the speed reducer casing 61. The first stage planetary gear 92 is supported on the first stage carrier 93 so as to be rotatable about the axis O and to revolve around the axis O.

<Second Stage Planetary Gear Mechanism>

The second stage planetary gear mechanism 100 includes a second stage transmission shaft 101, a second stage planetary gear 102, and a second stage carrier 103. The second stage transmission shaft 101 is provided to be rotatable about the axis O below the first stage transmission shaft 91, and is connected to the first stage carrier 93. A plurality of second stage planetary gears 102 are provided around the second stage transmission shaft 101. The second stage planetary gear 102 meshes with the sun gear teeth formed in the second stage transmission shaft 101 and the inner gear teeth formed in the inner peripheral surface of the speed reducer casing 61. The second stage planetary gear 102 is supported on the second stage carrier 103 so as to be rotatable about the axis O and to revolve around the axis O.

<Third Stage Planetary Gear Mechanism>

The third stage planetary gear mechanism 110 includes a third stage transmission shaft 111, a third stage planetary gear 112, and a third stage carrier 113. The third stage transmission shaft 111 is provided to be rotatable about an axis O below the second stage transmission shaft 101, and is connected to the second stage carrier 103. A plurality of third stage planetary gears 112 are provided around the third stage transmission shaft 111. The third stage planetary gear 112 meshes with the sun gear teeth formed in the third stage transmission shaft 111 and the third stage inner gear teeth formed in the inner peripheral surface of the speed reducer casing 61. The third stage planetary gear 112 is supported by the third stage carrier 113 so as to be rotatable about the axis O and to revolve around the axis O. The third stage carrier 113 is connected to an output shaft 70.

The transmission portion 80 transmits the reduced rotation to the output shaft 70 after reducing speed a plurality of times of the rotation of the rotary shaft 40 by such the plurality stages of planetary gear mechanism.

<Brake Mechanism>

As shown in FIGS. 3 and 4, the brake mechanism 120 is disposed on the upper side in the axial O direction of the first stage planetary gear mechanism 90 in the speed reducer casing 61.

As shown in FIG. 4, the brake mechanism 120 includes a disk support portion 121, a brake disk 122, a brake plate 123, a brake piston 130, and a brake spring 140.

The disk support portion 121 is a member having a cylindrical shape centered on the axis O. A lower end of the disk support portion 121 is integrally fixed to the first stage carrier 93 in the first stage planetary gear mechanism 90.

The brake disk 122 is an annular member, and a plurality of brake disks are disposed at intervals in the axial O direction so as to protrude from an outer peripheral surface of the disk support portion 121.

The brake plate 123 is an annular member, and a plurality of brake plates are disposed at intervals in the axial O direction so as to protrude from the inner peripheral surface of the speed reducer casing 61. The plurality of brake plates 123 and the plurality of brake disks 122 are alternately arranged in the order of the brake plate 123 and the brake disk 122 from the upper side in the axial O direction to the lower side in the axial O direction. The brake plate 123 and the brake disk 122 are capable of being brought into contact with each other.

The brake piston 130 is an annular member centered on the axis O and is disposed so as to be movable in the axial O direction on the upper side in the axial O direction of the brake plate 123.

An annular lower surface in the brake piston 130 is a plate contact surface 134.

The plate contact surface 134 comes into contact with the brake plate 123 from the upper side in the axial O direction over the entire peripheral direction.

On an annular upper surface of the brake piston 130, a plurality of piston-side accommodating recesses 135 which are recessed from the upper side in the axial O direction and which are formed at intervals in the peripheral direction are formed. A peripheral position of the piston-side accommodating recess 135 corresponds to a peripheral position of the electric motor-side accommodating recess 27e formed in the second casing 25 of the electric motor casing 21.

The brake spring 140 is accommodated in each spring accommodating portion defined by the piston-side accommodating recess 135 and the motor-side accommodating recess 27e which are opposed to each other in the axial O direction. The brake spring 140 is a coil spring extending in a direction parallel to the axis O and is accommodated in the spring accommodating portion in a compressed state.

<Lubricating Oil-Circulating Unit>

As shown in FIG. 3, the lubricating oil-circulating unit 150 supplies lubricating oil into the first accommodating space R1 in the electric motor casing 21, and supplies again the lubricating oil recovered from an inside of the second accommodating space R2 in the speed reducer casing 61 to the first accommodating space R1.

The lubricating oil-circulating unit 150 includes a lubricating oil flow path 151, a lubricating oil pump 152, a cooling portion 153, and a strainer 154.

The lubricating oil flow path 151 is a flow path formed by a flow path forming member such as a pipe provided outside the rotary drive device 10. A first end of the lubricating oil flow path 151 shown in FIG. 4, which is an end portion at an upstream side of the lubricating oil flow path, is connected to a second accommodating space R2 in the speed reducer casing 61. In the present embodiment, the first end of lubricating oil flow path 151 is connected to a portion between the output shaft bearing 71 and lower seal 72 in second accommodating space R2.

A second end of the lubricating oil flow path 151, which is an end portion at downstream side of the lubricating oil flow path, is connected to an opening of the center hole 40a in the upper end of the rotary shaft 40. The second end of the lubricating oil flow path 151 is connected to the first accommodating space R1 in the electric motor casing 21 via a cooling flow path in the rotor 38.

The lubricating oil pump 152 is provided in the middle of the lubricating oil flow path 151, and pumps lubricating oil from the first end toward the second end of the lubricating oil flow path 151, that is, from the second accommodating space R2 side toward the first accommodating space R1 side.

The cooling portion 153 is provided at a portion on the downstream side of the lubricating oil pump 152 in the lubricating oil flow path 151. The cooling portion 153 cools the lubricating oil flowing through the lubricating oil flow path 151 by exchanging heat with the external atmosphere.

The strainer 154 is provided at a portion on the upstream side of the lubricating oil pump 152 in the lubricating oil flow path 151. The strainer 154 has a filter for removing dirt and dust from lubricating oil passing through the lubricating oil flow path 151. The strainer 154 is preferably provided with a magnetic filter for removing iron powder generated from, for example, the gear teeth of the speed reducer 60.

<Operation and Effects>

When the brake mechanism 120 releases the brake, the speed reducer 60 and the electric motor 20 are in a rotatable state.

AC power is supplied to each coil 32 of the stator 30 of the electric motor 20 via the inverter 239, and the permanent magnets follow the rotating magnetic field generated by the coils 32, so that the rotor 38 rotates with respect to the stator 30. The rotation of the rotary shaft 40 of the rotor 38 is reduced in speed through the transmission portion 80 in the speed reducer 60, and is transmitted to the output shaft 70. In the present embodiment, reducing in speed is sequentially performed via three stages of the planetary gear mechanisms. Swing motion of the upper swing body 230 is carried out by the rotation of the output shaft 70.

When the upper swing body 230 swings, the electric motor 20 is driven with a high torque. Therefore, the rotor core 42 and the permanent magnets reach a high temperature due to the iron loss in the rotor core 42 and the eddy current loss in the permanent magnets. At the same time, the stator 30 reaches a high temperature due to copper loss at the coil 32 and iron loss at the stator core 31. When the stator 30 reaches a high temperature, the rotor core 42 reaches a higher temperature by the radiant heat of the stator 30. Therefore, the cooling oil is supplied into the electric motor 20 by the lubricating oil-circulating unit 150.

When the lubricating oil pump 152 of the lubricating oil-circulating unit 150 is operated, some of the lubricating oil stored in the second accommodating space R2 is supplied from the upper end into the center hole 40a of the rotary shaft 40 in the rotor 38 of the electric motor 20 shown in FIGS. 5 and 6 through the lubricating oil flow path 151.

The lubricating oil supplied to the center hole 40a of the rotary shaft 40 cools the rotor core 42 and the permanent magnets in the process of flowing through the first radial hole 40b, the inner axial-direction flow path 42b, the connection flow path 45a, and the outer axial-direction flow path 42c. The lubricating oil discharged through the discharge hole 46a is spread radially outward by a centrifugal force generated by the rotation of the rotor 38, thereby cooling the coil 32 and the stator core 31.

On the other hand, as shown in FIG. 9, some of the lubricating oil supplied to the center hole 40a of the rotary shaft 40 flows through the second radial hole 40c to be introduced into the annular space A. Some of the lubricating oil of the annular space A enters between the inner ring 36a and the outer ring 36b of the upper bearing 36. As a result, lubricity in the upper bearing 36 is ensured. The lubricating oil introduced between the inner ring 36a and the outer ring 36b is temporarily retained by the bearing shield 36d functioning as a weir, and then is discharged into the first accommodating space R1 through the clearance of the bearing shield 36d.

The lubricating oil introduced into the casing flow path 186 of the first casing 22 from the annular space A is supplied into the first accommodating space R1 from the radially outer end portion of the casing flow path 186, thereby cooling the coil 32 and stator core 31 of the stator 30.

The lubricating oil supplied to the stator 30 passes through the space between the stator core 31 and the rotor core 42 and between the teeth, and is introduced to the lower side in the axial O direction of the first accommodating space R1. Among the lubricating oil supplied to the stator 30, the lubricating oil introduced to the outer peripheral side passes through the outer peripheral-side flow path F formed between the core main body 31*a* of the stator core 31 and the inner peripheral surface of the first casing 22, and is introduced to the lower side in the axial O direction. In the process in which the lubricating oil passes through the outer peripheral-side flow path F, the stator core 31 is directly cooled from the outer peripheral side thereof.

The lubricating oil which accumulates radially inside among the lubricating oil which has fallen down from the stator 30 is discharged from the inside of the electric motor 20 to the lower side in the axial O direction through the main oil drain hole 50*a*, the auxiliary oil drain hole 50*b*, and the bearing oil drain hole 50*d* formed in the electric motor casing 21. When the rotary drive system 1 is operated, lubricating oil is mainly discharged to the lower side in the axial O direction of the electric motor 20 through the main oil drain hole 50*a*.

On the other hand, the lubricating oil which has passed through the outer peripheral-side flow path F mainly passes through the outer peripheral-side oil drain hole 50*c* and is discharged to the lower side in the axial O direction of the electric motor 20.

The lubricating oil is discharged to the lower side in the axial O direction of the electric motor 20 through the communication hole 50, so that the lubricating oil is supplied to the second accommodating space R2 in the speed reducer casing 61. The lubricating oil which is supplied to the second accommodating space R2 so as to fall down from the communication hole 50 lubricates each of the gear teeth of the first stage planetary gear mechanism 90, and is then returned to the lubricating oil stored in the second accommodating space R2.

As described above, according to the rotary drive system 1 of the present embodiment, the lubricating oil supplied into the electric motor casing 21 is introduced into the speed reducer casing 61 through the communication hole 50. The lubricating oil merges with the lubricating oil stored in the speed reducer casing 61 as a tank. Then, some of the stored lubricating oil is capable of being supplied again to the electric motor 20 by the lubricating oil-circulating unit 150. As a result, it is possible to consistently carry out the cooling of the rotor 38 and the stator 30 of the electric motor 20 and the lubricating of the transmission portion 80 in the speed reducer 60 via the lubricating oil-circulating unit 150.

In the present embodiment, as shown in FIG. 7, the core convex portion 31*b* of the stator core 31 partially abuts the inner peripheral surface 23*a* of the electric motor casing 21 in the peripheral direction, so that the outer peripheral-side flow path F through which lubricating oil is capable of flowing is formed between the core main body 31*a* of the stator core 31 and the inner peripheral surface 23*a* of the electric motor casing 21. When the lubricating oil flows through the outer peripheral-side flow path F, the lubricating oil comes into contact with the outer peripheral surface 183 of the core main body 31*a* of the stator core 31. As a result, the stator core 31 is capable of being cooled directly from the outer peripheral side thereof, so that it is possible to improve the cooling performance of the stator core 31.

Further, it is possible to cool the stator core 31 from the outer peripheral side thereof without separately forming a flow path through which the cooling medium flows to the electric motor casing 21. Therefore, it is not necessary to perform the machining of the flow path in the electric motor casing 21, so that the production process is not complicated. Therefore, it is possible to reduce the production cost.

Since the outer peripheral-side flow path F extends in the peripheral direction with a uniform size in the radial direction, lubricating oil flows uniformly over the peripheral direction. Thus, it is possible to cool the outer peripheral surface of the stator core 31 without the lubricating oil being greatly non-uniformity in the peripheral direction.

Further, when the hydraulic excavator 200 is positioned on an inclined ground, the axis O of the rotary drive system 1 is inclined from the direction coinciding with the vertical direction. Even in such a case, since the outer peripheral-side flow path F is formed in the present embodiment, it is possible to allow the lubricating oil guided to part in the peripheral direction of the axis O according to the inclination to flow to the second bottom portion 27 side. Therefore, it is possible to suppress the lubricating oil from retaining in the first accommodating space R1.

The core convex portion 31*b* of the stator core 31 has a top portion 185*b* having a cylindrical surface shape that has an outer diameter corresponding to an inner diameter of an inner peripheral surface 23*a* of the electric motor casing 21. By fitting the top portion 185*b* of the core convex portion 31*b* onto the inner peripheral surface 23*a* of the electric motor casing 21, it is possible to integrally fix the stator core 31 to the electric motor casing 21 while the center of the stator core 31 and the center of the electric motor casing 21 are aligned with each other.

Further, as shown in FIGS. 5 and 6, the first casing 22 and the second casing 25 of the electric motor casing 21 are fitted to each other, so that their centers are aligned with each other. Further, as shown in FIG. 6, the lower end of the core main body 31*a* of the stator core 31 is fitted onto the fitting inner peripheral surface 181*a* of the fitting portion 26*d*. Since the fitting inner peripheral surface 181*a* has an inner diameter corresponding to the outer diameter of the outer peripheral surface 183 in the core main body 31*a* of the stator core 31, it is possible to align the center of the stator core 31 and the center of the second casing 25 with each other. As a result, it is possible to easily align the centers of the first casing 22, the second casing 25 and the stator core 31 with each other, and the centering work of these members can be smoothly carried out.

In a state in which the stator core 31 is fitted into the fitting portion 26*d*, the lower end of the stator core 31 comes into contact with the mounting end surface 181*b* of the fitting portion 26*d*. Thus, it is possible to carry out easily the positioning of the position in the axial O direction of the stator core 31.

As shown in FIGS. 6 and 8, in a portion at a peripheral side in the electric motor casing 21, an outer peripheral-side oil drain hole 50*c* is formed at a position corresponding to a portion immediately below the outer peripheral-side flow path F. As a result, even when the flow rate of lubricating oil is increased and a large amount of lubricating oil flows through the outer peripheral-side flow path F, it is possible to smoothly discharge the lubricating oil to the lower side in the axial O direction of the electric motor casing 21. Therefore, it is possible to prevent the lubricating oil which has risen in temperature from retaining in the electric motor casing 21. Moreover, even when the hydraulic excavator 200 is on the inclined ground, it is possible to smoothly discharge the lubricating oil collected in part in the peripheral direction in accordance with the inclination to the second accommodating space R2 side through the outer peripheral-side oil drain hole 50c.

In the present embodiment, the stator 30 is cooled from the inner peripheral side and the outer peripheral side thereof by only the lubricating oil introduced into the first accommodating space R1 via the rotor 38. Therefore, it is preferable to increase the flow rate of the lubricating oil introduced into the electric motor casing 21, as compared with the case where the water-cooling method in which a water jacket is formed on the electric motor casing 21 for cooling and the oil cooling method are used in combination.

In the present embodiment, as shown in FIG. 9, some of the lubricating oil introduced into the rotary shaft 40 is directly supplied to the stator 30 via the second radial hole 40c of the rotary shaft 40, the annular space A, and the casing flow path 186 of the electric motor casing 21. As a result, the lubricating oil having a lower temperature than the lubricating oil supplied to the stator 30 after passing through the rotor core 42 from the rotary shaft 40 can be supplied to the outer peripheral side of the stator 30. Therefore, it is possible to effectively cool the outer peripheral portion of the stator 30, which is particularly large in heat generation, in a process in which the lubricating oil having a low temperature passes through the outer peripheral-side flow path F.

Since the lower side of the annular space A in the axial O direction is defined by the upper bearing 36, it is possible to secure lubricity of the upper bearing 36 by using some of the lubricating oil introduced into the casing flow path 186 of the electric motor casing 21. The upper bearing 36 is provided with a bearing shield 36d, and the lubricating oil is retained in the upper bearing 36 by the bearing shield 36d. Therefore, while lubricating the upper bearing 36 appropriately by lubricating oil introduced into the annular space A from the second radial hole 40c of the rotary shaft, it is possible to directly supply an appropriate amount of cooling oil to the stator from the casing flow path 186.

Other Embodiments

Although the embodiments of the present invention have been described above, the present invention is not limited thereto and can be appropriately changed without departing from the technical idea of the present invention.

In the present embodiment, an example has been described in which the transmission portion 80 has a total of three stages, that is, a first stage, a middle stage, and a final stage, of the planetary gear mechanisms, but the present invention is not limited thereto, and may include, for example, only one stage, two stages, four stages or more, of the planetary gear mechanisms. The planetary gear mechanism in the middle stage may be divided into a plurality of stages.

The structure of the rotor 38 is not limited to the present embodiment, and may have other cooling structures.

In the embodiment, although an example in which the present invention is applied to the rotary drive system 1 of the hydraulic excavator 200 as a work machine has been described, the above-described rotary drive system 1 may be applied to a mechanism that swings or rotates part of the other work machine.

The present invention may be applied not only to the rotary drive system 1 having the electric motor 20 and the speed reducer 60 but also to the electric motor alone.

In the embodiment, although the axis O which becomes the rotation axis of the electric motor 20 extends in the vertical direction, the present invention may be applied to, for example, an electric motor which is horizontally installed and the axis O of which is oriented in the horizontal direction.

INDUSTRIAL APPLICABILITY

The present invention is applicable to an electric motor, a rotary drive system, and a hydraulic excavator. According to the present invention, cooling of the stator core is capable of being effectively performed while reducing the cost.

EXPLANATION OF REFERENCE SIGN

1: Rotary Drive System;
10: Rotary Drive Device;
20: Electric Motor;
21: Electric Motor Casing;
22: First Casing;
23: First Cylindrical Portion;
23a: Inner Peripheral Surface;
23b: First Flange;
24: First Bottom;
24a: First Through-Hole;
24b: Annular Convex Portion 24b;
25: Second Casing;
26: Second Cylindrical Portion;
26a: Outer Peripheral Surface;
26b: Inner Peripheral Surface;
26c: Upper End Face;
26d: Fitting Portion;
26e: Bolt Fixing Hole;
27: Second Bottom Portion;
27a: Second Through-Hole;
27b: First Bottom Surface;
27c: Second Bottom Surface;
27d: Third Bottom Surface;
27e: Electric Motor-Side Accommodating Recess;
27f: Lower Flange;
30: Stator;
31: Stator Core 31;
31a: Core Main Body;
31b: Core Convex Portion;
32: Coil;
32a: Upper Coil End;
32b: Lower Coil End;
33: Bolt;
35: Upper Seal;
36: Upper Bearing;
36a: Inner Ring;
36b Outer Ring;
36c: Rolling Body;
36d: Bearing Shield;
37: Lower Bearing;
37a: Inner Ring;
37b Outer Ring;
37c: Rolling Body;
37d: Bearing Shield;
38: Rotor;
40: Rotary Shaft;
40a: Center Hole;
40b: First Radial Hole;

40c: Second Radial Hole;
42: Rotor Core;
42a: Inner Peripheral Surface;
42b: Inner Axial-Direction Flow Path;
42c: Outer Axial-Direction Flow Path;
45: Lower End Plate;
45a: Connection Flow Path;
46: Upper End Plate;
46a: Discharge Hole;
50: Communication Hole;
50a: Main Oil Drain Hole;
50b: Auxiliary Oil Drain Hole;
50c: Outer Peripheral-Side Oil Drain Hole;
50d: Bearing Oil Drain Hole;
60: Speed Reducer;
61: Speed Reducer Casing;
61a: Hydraulic Pressure Supply Hole;
62a: First Stage Inner Gear Teeth;
62b: Second Stage Inner Gear Teeth;
62c: Third Stage Inner Gear Teeth;
63a: First Inner Peripheral Surface;
63b: Second Inner Peripheral Surface;
64a: First Sliding Contact Inner Peripheral Surface;
64b: Second Sliding Contact Inner Peripheral Surface;
64c: Casing-Side Step Surface;
65: Oil Inspection Hole;
70: Output Shaft;
71: Output Shaft Bearing;
72: Lower Seal;
80: Transmission Portion;
90: First Stage Planetary Gear Mechanism;
91: First Stage Transmission Shaft;
92: First Stage Planetary Gear;
93: First Stage Carrier;
94: First Stage Carrier Shaft;
100: Second Stage Planetary Gear Mechanism;
101: Second Stage Transmission Shaft;
102: Second Stage Planetary Gear;
103: Second Stage Carrier;
104: Second Stage Carrier Shaft;
105: Second Stage Upper Plate Portion;
110: Third Stage Planetary Gear Mechanism;
111: Third Stage Transmission Shaft;
112: Third Stage Planetary Gear;
113: Third Stage Carrier;
115: Third Stage Upper Plate Portion;
120: Brake Mechanism;
121: Disk Support Portion;
122: Brake Disc;
123: Brake Plate;
130: Brake Piston;
140: Brake Spring;
150: Lubricating Oil-Circulating Unit;
151: Lubricating Oil Flow Path;
152: Lubricating Oil Pump;
153: Cooling Portion;
154: Strainer;
180a: Abutting Inner Peripheral Surface;
180b: Tapered Inner Peripheral Surface;
180c: Cylindrical Inner Peripheral Surface;
181: Convex Portion;
181a: Fitting Inner Peripheral Surface;
181b: Mounting End Surface;
183: Outer Peripheral Surface;
184a: Yoke;
184b: Teeth;
185a: Inclination Surface;
185b: Top Portion;
186: Casing Flow Path;
200: Hydraulic Excavator;
211: Crawler Belts;
210: Undercarriage;
220: Swing Circle;
221: Outer Race;
222: Inner Race;
223: Swing Pinion;
230: Upper Swing Body;
231: Cab;
232: Work Equipment;
233: Boom;
234: Arm;
235: Bucket;
236: Engine;
237: Generator Motor;
238: Hydraulic Pump;
239: Inverter;
240: Capacitor;
L: Swing Axis;
O: Axis;
R1: First Accommodating Space;
R2: Second Accommodating Space;
R3: Spring Accommodating Portion;
A: Annular Space;
F: Outer Peripheral-Side Flow Path

The invention claimed is:

1. An electric motor, comprising:
a rotor including a rotary shaft provided so as to be rotatable around an axis thereof and a rotor core fixed to an outer peripheral surface of the rotary shaft;
a stator including:
a core main body having a cylindrical shape surrounding the rotor core from an outer peripheral side of the rotor core;
a plurality of core convex portions provided at intervals in a peripheral direction, and each of which projects from an outer peripheral surface of the core main body and which extends in an axial direction of the rotary shaft; and
a plurality of coils attached to the core main body; and
a casing in which a first accommodating space accommodating the rotor and the stator is formed and which has an inner peripheral surface including an abutting inner peripheral surface on which a top portion of the core convex portion outside in a radial direction abuts,
wherein an outer peripheral-side flow path on which lubricating oil is capable of flowing is formed between the core convex portions adjacent to each other in the peripheral direction by the outer peripheral surface of the core main body and the inner peripheral surface of the casing,
wherein the abutting inner peripheral surface has a circular shape centered on the axis in a sectional view orthogonal to the axis,
wherein the top portion of each of the core convex portions has an outer diameter corresponding to an inner diameter of the abutting inner peripheral surface and has a cylindrical surface shape fitting onto the abutting inner peripheral surface over the peripheral direction,
wherein the casing includes:
a first casing that has a first cylindrical portion having, as the inner peripheral surface, the abutting inner peripheral surface and a tapered inner peripheral surface expanding in diameter from the abutting inner peripheral surface toward the one side in the axial direction, and that has a first bottom portion closing the first cylindrical portion from the other side in the axial direction, and a second casing that has a second cylindrical portion fitted to the first cylindrical portion from an inside of the first cylindrical portion and a second bottom portion closing the second cylindrical portion from the one side in the axial direction; and wherein the second cylindrical portion includes:

a fitting inner peripheral surface having an inner diameter corresponding to the outer peripheral surface of the core main body and fitted to the outer peripheral surface of the core main body.

2. The electric motor according to claim 1, wherein an outer peripheral-side oil drain hole passing through the second cylindrical portion in the axial direction is formed in a radially outer portion of the fitting inner peripheral surface in the second cylindrical portion, and a main oil drain hole passing through the second bottom portion in the axial direction is formed in the second bottom portion.

3. The electric motor according to claim 2, wherein the rotary shaft is provided so as to be rotatable around the axis extending in the vertical direction, and the rotary shaft has a center hole extending from an end portion on the upper side in the axial direction of the rotary shaft toward the lower side in the axial direction, a first radial hole extending from the center hole to the outer peripheral surface of the rotary shaft, and a second radial hole extending from the center hole to the outer peripheral surface of the rotary shaft at the upper side in the axial direction of the first radial hole, wherein the rotor core has a rotor core flow path communicating with the first radial hole and opening into an outside of the rotor, and wherein the casing has a casing flow path communicating with the second radial hole and opening on the upper side in the axial direction of the stator in the casing.

4. The electric motor according to claim 3, further comprising:

an upper bearing configured to support the rotary shaft so as to be rotatable around the axis with respect to the casing at the upper side in the axial direction than the rotor core on the rotary shaft, wherein the upper bearing is provided between the second radial hole and the casing flow path, and wherein the upper bearing includes:

an outer ring having an annular shape and fixed to the outer peripheral surface of the rotary shaft;

an inner ring surrounding the outer ring from the outer peripheral side thereof and fixed to the casing;

a rolling body disposed between the outer ring and the inner ring; and a bearing shield disposed on the lower side in the axial direction of the rolling body in a space between the outer ring and the inner ring and having an annular shape.

5. A rotary drive system, comprising:

the electric motor according to claim 2 in which the rotary shaft is provided so as to be rotatable around the axis extending in the vertical direction, a speed reducer including an output shaft provided to be rotatable around the axis on the lower side in the axial direction of the rotary shaft projecting from the casing to the lower side in the axial direction, a transmission portion configured to reduce speed of a rotation of the rotary shaft and transmit the reduced rotation to the output shaft, and a speed reducer casing forming a second accommodating space accommodating the output shaft and the transmission portion, and a lubricating oil-circulating unit configured to supply lubricating oil into the first accommodating space, recover the lubricating oil introduced into the second accommodating space from the first accommodating space, and supply again the lubricating oil to the first accommodating space.

6. A hydraulic excavator, comprising:

an undercarriage;

an upper swing body provided on the undercarriage; and a rotary drive system according to claim 5 configured to swing the upper swing body around the axis with respect to the undercarriage.

7. The electric motor according to claim 1, wherein the rotary shaft is provided so as to be rotatable around the axis extending in the vertical direction, and the rotary shaft has a center hole extending from an end portion on the upper side in the axial direction of the rotary shaft toward the lower side in the axial direction, a first radial hole extending from the center hole to the outer peripheral surface of the rotary shaft, and a second radial hole extending from the center hole to the outer peripheral surface of the rotary shaft at the upper side in the axial direction of the first radial hole, wherein the rotor core has a rotor core flow path communicating with the first radial hole and opening into an outside of the rotor, and wherein the casing has a casing flow path communicating with the second radial hole and opening on the upper side in the axial direction of the stator in the casing.

8. The electric motor according to claim 7, further comprising:

an upper bearing configured to support the rotary shaft so as to be rotatable around the axis with respect to the casing at the upper side in the axial direction than the rotor core on the rotary shaft, wherein the upper bearing is provided between the second radial hole and the casing flow path, and wherein the upper bearing includes:

an outer ring having an annular shape and fixed to the outer peripheral surface of the rotary shaft;

an inner ring surrounding the outer ring from the outer peripheral side thereof and fixed to the casing;

a rolling body disposed between the outer ring and the inner ring; and a bearing shield disposed on the lower side in the axial direction of the rolling body in a space between the outer ring and the inner ring and having an annular shape.

9. A rotary drive system, comprising:

the electric motor according to claim 1 in which the rotary shaft is provided so as to be rotatable around the axis extending in the vertical direction, a speed reducer including an output shaft provided to be rotatable around the axis on the lower side in the axial direction of the rotary shaft projecting from the casing to the lower side in the axial direction, a transmission portion configured to reduce speed of a rotation of the rotary shaft and transmit the reduced rotation to the output shaft, and a speed reducer casing forming a second accommodating space accommodating the output shaft and the transmission portion, and a lubricating oil-circulating unit configured to supply lubricating oil into the first accommodating space, recover the lubricating oil introduced into the second accommodating space from the first accommodating space, and supply again the lubricating oil to the first accommodating space.

10. A hydraulic excavator, comprising:

an undercarriage;

an upper swing body provided on the undercarriage;

a rotary drive system according to claim 9 configured to swing the upper swing body around the axis with respect to the undercarriage.

* * * * *